Feb. 4, 1936. J. BAYER ET AL 2,029,604
CARRYING OUT EXOTHERMIC CATALYTIC GAS REACTIONS
Filed Feb. 10, 1931 7 Sheets-Sheet 3

Fig.3.

Joseph Bayer
Alfred Haltmeier
Karl Hencky
Inventors

By their Attorneys

Feb. 4, 1936.   J. BAYER ET AL   2,029,604
CARRYING OUT EXOTHERMIC CATALYTIC GAS REACTIONS
Filed Feb. 10, 1931   7 Sheets-Sheet 4

Fig.4.

Joseph Bayer
Alfred Haltmeier
Karl Hencky
Inventors

By their Attorneys

Patented Feb. 4, 1936

2,029,604

UNITED STATES PATENT OFFICE 2,029,604

CARRYING OUT EXOTHERMIC CATALYTIC GAS REACTIONS

Joseph Bayer, Ludwigshafen-on-the-Rhine, Alfred Haltmeier, Cologne, and Karl Hencky, Leverkusen, Germany, assignors to I. G. Farbenindustrie Aktiengesellschaft, Frankfort-on-the-Main, Germany Application February 10, 1931, Serial No. 514,782
In Germany February 28, 1930

5 Claims. (Cl. 23—288)

The present invention relates to improvements in carrying out exothermic catalytic gas reactions, especially the catalytic oxidation of sulphur dioxide to sulphur trioxide, and to improved apparatus for carrying out such reactions.

It is already known to carry out such reactions in apparatus containing one or more bundles of tubes of circular, elliptical or polygonal cross-section, the catalyst being arranged in these tubes. By means of these known apparatus it is possible to subject the catalyst which by the arrangement in the tubes is subdivided into a number of single elements arranged in parallel to each other, to a more or less controllable cooling by means of the initial gases introduced in a comparatively cold state, and passing around the tubes, whereby the gases are simultaneously preheated to a temperature at which the desired reaction sets in, which temperature of course varies in accordance with the composition of the gases and the nature of the catalyst used in each case. Similarly, apparatus has been used hitherto in which the catalyst was cooled by means of the fresh gases flowing through a number of tubes arranged within the catalyst. In arrangements of this kind, the catalyst may be regarded as being subdivided by the tubes into a plurality of passages for the gas, arranged in parallel to each other. The aforesaid apparatus has been used successfully in work on an industrial scale, but it is not always possible to obtain the most favourable temperature in all places of the catalyst as is most desirable having regard to the kinetics of the reaction.

We have now found that even with a high load of the catalyst and when treating comparatively concentrated gases the temperature can be controlled with great ease and very exactly by passing the gas to be reacted upon in a plurality of passages, arranged in parallel to each other, first through substantially free space in said passages and then through catalytic material arranged in the last part of said passages, then collecting the gas leaving said plurality of passages in a chamber common to all of said passages, whereby any temperature differences between the single gas currents are equalized, then introducing said gas, in a direction of flow opposite to that of the gas in said first plurality of passages, into another plurality of passages, arranged in parallel to each other, and therein passing said gas while being in heat exchange relation to the gas in the first-mentioned plurality of passages through substantially free space and through catalytic material promoting the reaction. In the second plurality of passages the catalytic material is preferably so disposed therein that it is in heat exchange relation to the gas in the substantially free space of the first plurality of passages, whereas the gas, when passing through the substantially free space of the second plurality of passages, is in heat exchange relation to the catalytic material in the first plurality of passages.

This process is carried out in apparatus, similar in construction to these hereinbefore referred to, containing bundles of tubes, in which apparatus the catalyst is arranged according to the present invention partly within the tubes and partly in the space surrounding the said tubes. In such apparatus the fresh gases may either first pass around the tubes and then through the latter or in the inverse direction.

We shall now explain the nature of the process according to our invention and the apparatus used more in detail by reference to the accompanying diagrammatic drawings, in which.

The common feature of all apparatus shown in the drawings is a vertical, for example cylindrical vessel 1 provided with a false bottom 2 in which are inserted a number of vertically arranged tubes 3. By the said false bottom the lower ends of the said tubes are connected to a chamber 4 while the upper ends of the said tubes extend almost to the top of the vessel 1 and end freely, thus forming a chamber 5 common to all of said tubes and extending over the whole cross-sectional area of the vessel.

Figure 1:
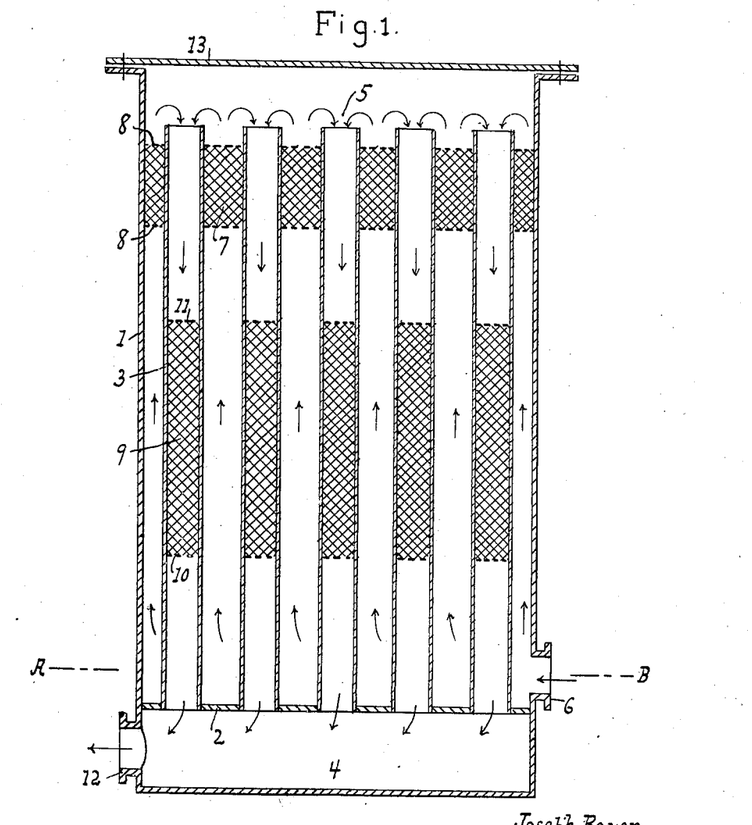
Figures 1, 3, 3a, 4, 5, 7 and 8 represent in vertical section some modifications of apparatus involving the aforesaid principle of our invention.
Figure 2:
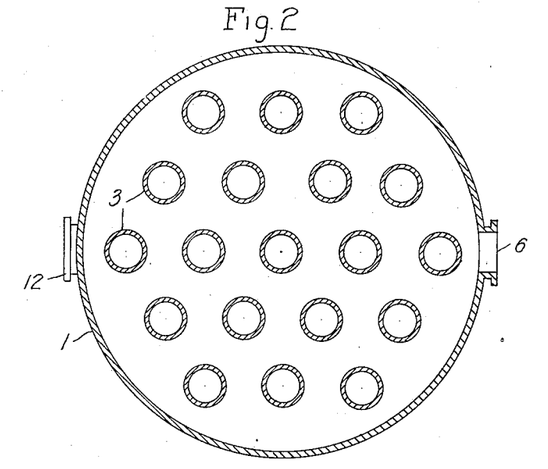
Figure 2 represents a horizontal section through the apparatus shown in Figure 1, taken on the line A—B.

In the apparatus shown in Figures 1 and 2 the gases to be subjected to the reaction are introduced by means of a tube or conduit 6 into the space surrounding the said tubes 3. The gases pass upward in the said space where they are preheated by heat exchange with the hot gases flowing down through the interior of the tubes 3 and in the upper part of the said space they pass through a layer 7 of the catalyst arranged between sieve plates 8. When reaching this catalyst the gases have reached the necessary temperature and a further increase of the temperature is caused by the reaction taking place within said catalyst layer 7, especially in view of the fact that in this part of their course the gases are not subjected to any cooling action. The height of the catalyst layer must of course be adapted to the speed and the concentration of the gases so that the optimal reaction temperature is not, or not substantially, exceeded. The gases leaving the said layer 7 of catalyst are then collected in the chamber 5 at the top of the vessel 1 and then pass in a downward direction through the tubes 3. In the upper part of these tubes the gases are somewhat cooled by heat exchange with the initial gas passing through the space surrounding the tubes and then they pass into the layers 9 of the catalyst arranged between sieve plates 10 and 11 in said tubes 3. In this layer of catalyst the reaction is completed. The gases then pass through the lower empty part of the tubes 3 where they are again in heat exchange relation with the cold incoming gases. Finally the gases having undergone the reaction are collected in the chamber 4 and withdrawn therefrom by a tube 12. It is a particular advantage of this arrangement that in the chamber 5 the gases having passed the first catalyst layer are subjected to an intense mixing due to their direction of flow being reversed. If desired, the gases may be intermediately cooled while in the chamber 5, for example by removing wholly or partly the heat insulation from the cover 13 of the vessel 1 which in its other parts is of course insulated against losses of heat. For the sake of clearness this insulation is not shown in the drawings. Such cooling of the gases in the chamber 5 is necessary especially when working with highly concentrated gases. If necessary the said cover 13 may even be provided with cooling devices, whereby the cooling action can be further intensified.

Figure 3:
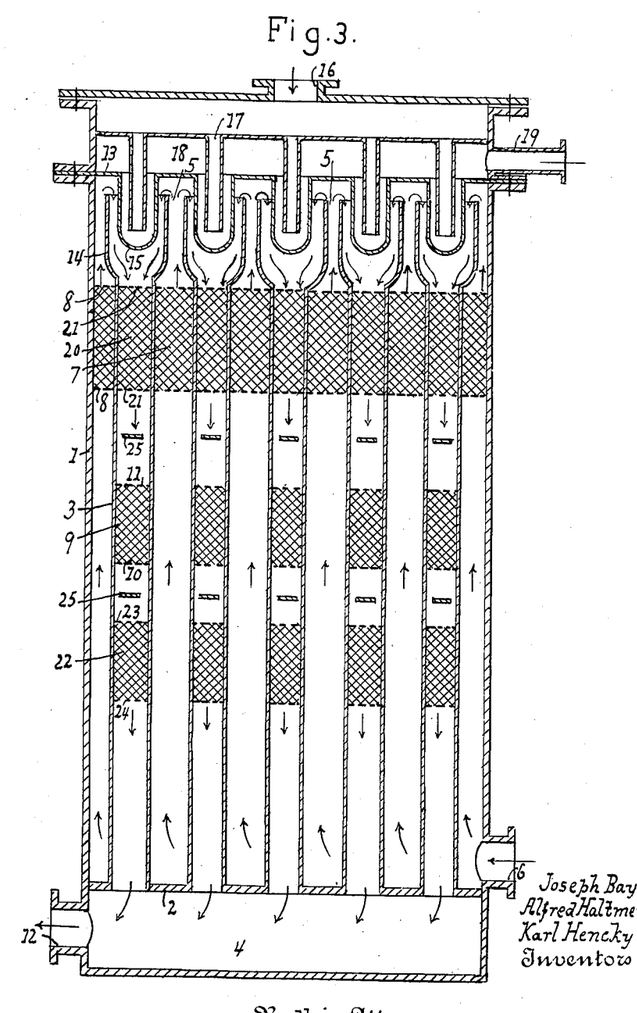

An arrangement of this kind is illustrated in Figure 3. In this mace the catalyst tubes 3 are widened in their upper parts 14 and the cover 13 is provided with short wide tubes closed at their lower ends 15. A cooling medium can be supplied into these tubes 15 by way of a common supply pipe 16 and the single tubes 17 and withdrawn therefrom by way of the chamber 18 and the tube 19. In the arrangement shown in Figure 3 there is the further feature that the catalyst is arranged not only at 7 in the space surrounding the upper part of the tubes 3, but also within these tubes at the same level at 20 where it is kept between sieve plates 21. Further the lower layer of the catalyst in the tubes is subdivided into several groups 9 and 22 kept between sieve plates 10 and 11, and 23 and 24 respectively. By subdividing the catalyst in this manner, the hot gases in the innermost part of the tubes 3 are intensely mixed with the cooler portions flowing in the neighborhood of the walls of the tubes, so that the heat is more uniformly distributed in the reaction gas. This mixing may be further improved by the arrangement of baffle plates 25 within the tubes 3.

Figure 3A:
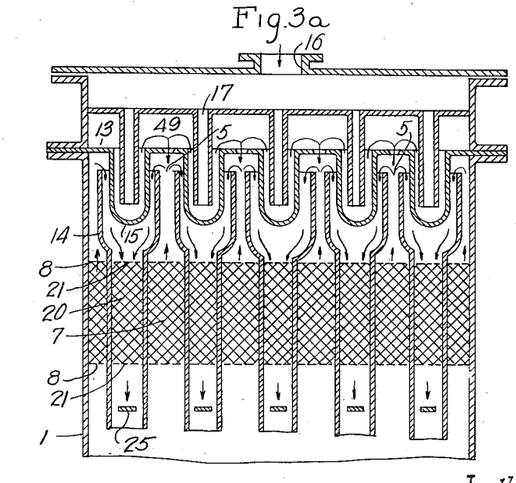

Instead of providing for cooling by special cooling means, such as water or the like at the place where the direction of flow of the gases is reversed, that is in the chamber 5, the gases may also be cooled by introducing fresh, cool initial gas by means of suitable distributing means. For example the arrangement shown in Figure 3 may be slightly modified as shown in Figure 3a; this modification of the apparatus is suitable for introducing cool fresh gases by holes 49 situated in the cover 13; in this modification the outlet pipe 19 is closed or is not present at all. The cool fresh gases are introduced by the inlet pipe 16 and after passing the tubes 17 and 15 they enter the upper parts 14 of the catalyst tubes, simultaneously mixing with the hot reaction gases which come from the catalyst layer 7 and thereby cooling the said hot gases.

Figure 4:
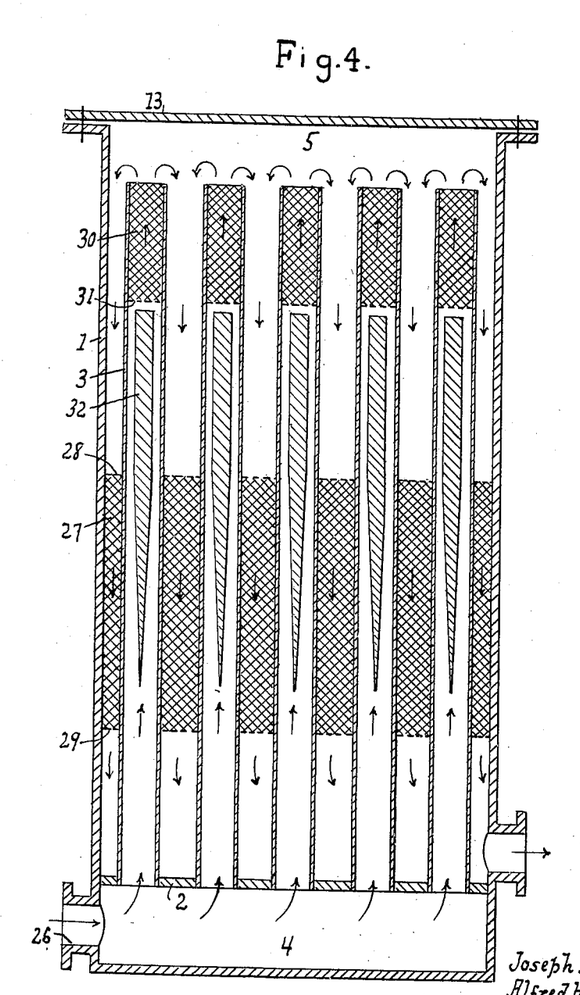

In the arrangement shown in Figure 4 the fresh initial gases are admitted into the chamber 4 by the tube 26 and are then first passed through the interior of the tubes 3 where they are in heat exchange relation with the catalytic layer 27 arranged between sieve plates 28 and 29 in the space surrounding the tubes 3. In a preheated state they enter the layers of catalyst 30 arranged upon sieve plates 31 in the upper part of the tubes 3. Within the empty parts of the tubes 3, displacing devices 32, the lower portions of which are of conical shape, are arranged for further improving the exchange of heat. By these displacing bodies 32, the heat exchange action is particularly strong at those places of the catalyst layer 27 where this is necessary in view of the kinetics of the reaction.

Figures 5, 6:
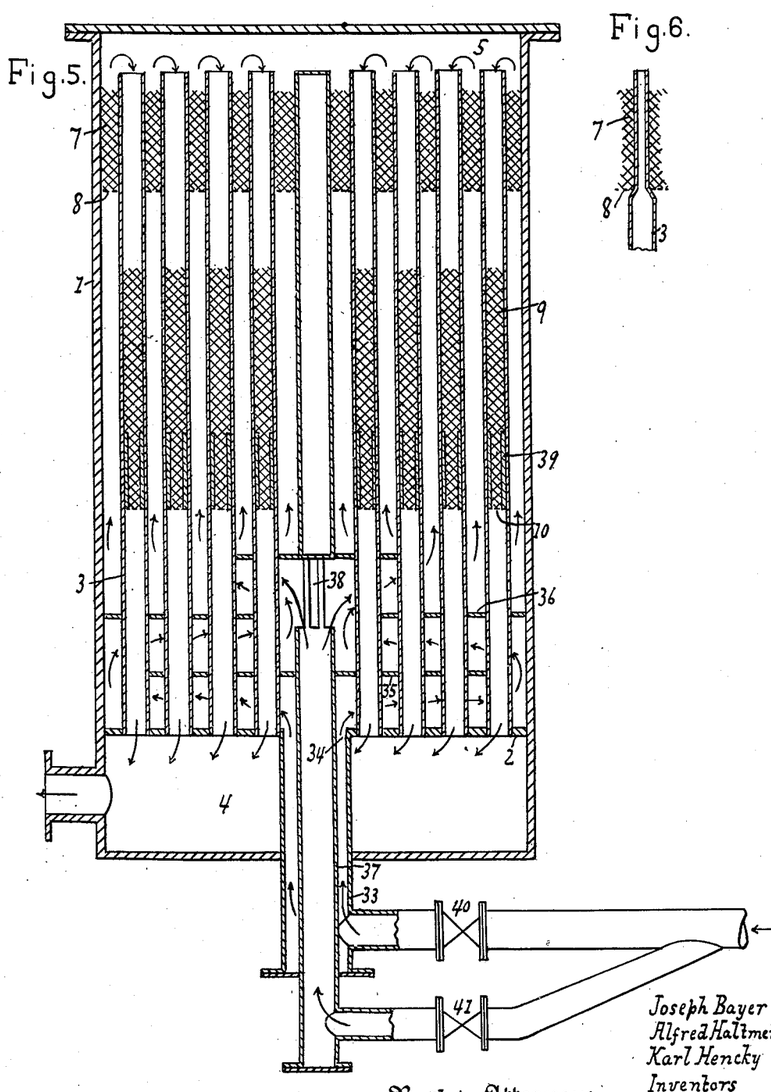
Figure 6 represents in vertical section a detail of a modified form of the tubes of the apparatus shown in Figure 5.

Still another modification of apparatus suitable for work in accordance with the present invention is shown in Figure 5. In this arrangement the initial gases are admitted by a central tube 33 into the space surrounding the tubes 3 by means of the passage 34. In this space they pass over the surface of the tubes 3, due to baffle plates 35 and 36 in the so called cross current manner. A further portion of initial gas may be admitted through the slits 38 in the tube 37 inserted within the tube 33. The gases pass upwards through the space surrounding the tubes and in the upper part thereof they pass through a layer of catalyst 7 arranged on a sieve plate 8. It is preferable to provide the tubes 3 with a smaller diameter in that part which is arranged within the catalyst layer 39, as is shown in connection with a single tube in Figure 6. The gases then pass downward through the interior of the tubes 3 and through the catalyst 9 arranged therein on sieve plates 10. In the lower part of the catalyst layers 9 loss of heat through the wall of the tubes 3 is prevented by means of the asbestos packing 39. The amount of initial gas admitted by the slits 34 and 38 respectively can be controlled by means of the valves 40 and 41 respectively.

Figure 7:
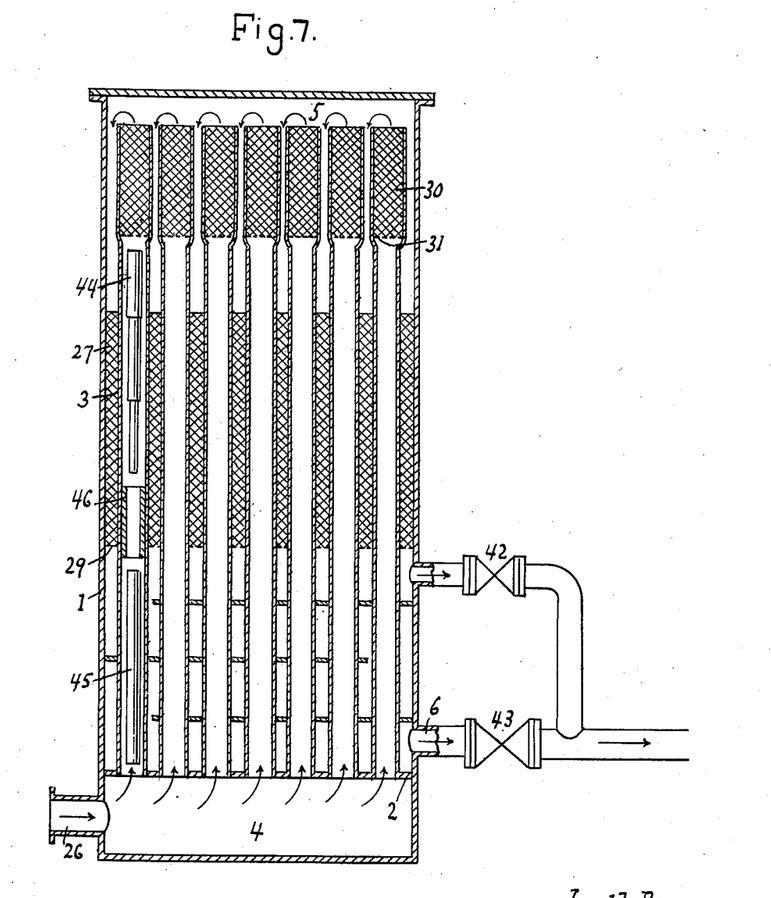

In the arrangement shown in Figure 7 the tubes 3 are widened in their upper portions and in this part of the tubes a catalyst 30 is arranged on sieve plates 31. The gases pass first through the tubes and through the catalyst layers 30 and then in a downward direction through the space surrounding the tubes 3 in which a catalyst layer 27 is arranged on a sieve plate 29. The initial gases are admitted by a tube 26 whereas the gases having undergone the reaction are withdrawn either by a tube and valve 42 or after having passed in cross current to the tubes 3 by a tube and valve 43. In order to improve the transfer of heat between the gases inside the tubes 3 and those outside the said tubes arrangements may be made within the tubes 3 as shown for example at 44 and 45. These devices shown at 44 and 45 are blind tubes acting as displacing and irradiating devices, since on the one hand by increasing the speed of the gases they facilitate transfer of heat by convection and on the other hand by their irradiating surface they facilitate the transfer of heat by radiation. If these devices are provided with different diameters as shown for example at 44, it is possible to so control the exchange of heat that the optimal temperature throughout the catalyst is obtained. In order to prevent the lower part of the catalyst layer 27 from being too strongly cooled, it is preferable to arrange within the tubes 3 isolating tubes 46 which prevent transfer of heat from the lower part of the catalyst layer 27.

Figure 8:
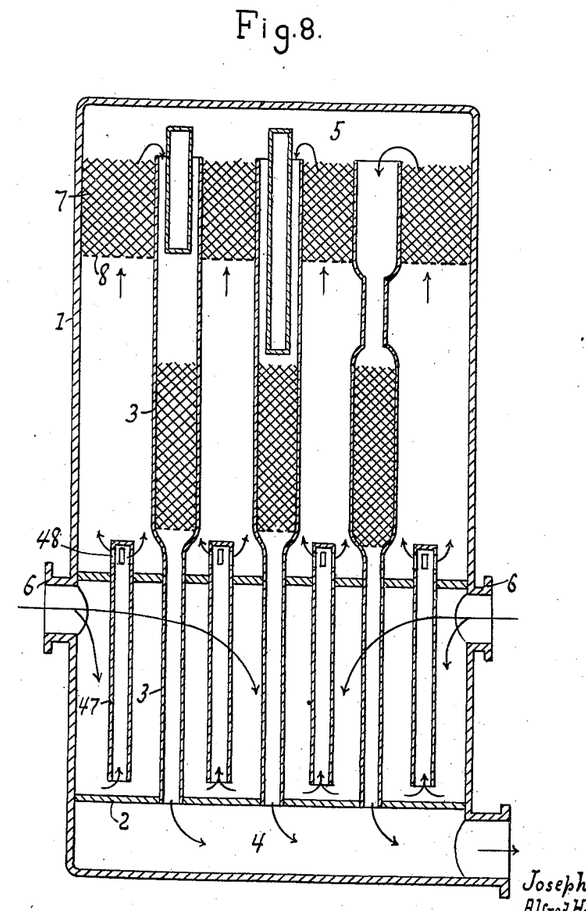

A further modification of apparatus according to our invention is shown in Figure 8. In this arrangement the initial gases are admitted by tubes 6. They flow around the lower empty parts of the tubes 3 and then enter by means of the tubes 47 and the slits 48 into the space surrounding the upper part of the tubes 3. The distribution of the gases and the exchange of heat is further improved by the tubes 3 having a small diameter in their lowest part. The upper part of the tubes 3 may be arranged in different ways as shown in Figure 8.

The method of working and the use of the apparatus in accordance with the present invention has the advantage that the catalyst is utilized to a substantially higher degree than in the apparatus hitherto known and that the extent to which the gases leaving the apparatus have undergone reaction is largely independent of the amount and concentration of the gases and that the distribution of gas and heat throughout the apparatus can be adapted to the kinetics of the reaction.

While the essential feature of our invention has been explained in the foregoing mainly with reference to the production of sulphuric acid by the catalytic oxidation of sulphur dioxide it is to be understood that our invention is not limited to this particular reaction, but that the principles described in the foregoing can be applied in a similar manner to other exothermic catalytic gas reactions and in particular also to the catalytic oxidation of organic compounds, such as naphthalene, anthracene, acenaphthene and the like.

What we claim is:—

1. The process of carrying out exothermic catalytic gas reactions which comprises passing the gas to be reacted upon in a plurality of passages, arranged in parallel to each other, first through substantially free space in said passages and then through catalytic material promoting the desired reaction arranged in the last part of said passages, collecting the gas leaving said plurality of passages in a space common to all of said passages, then introducing said gas, in a direction of flow opposite to that of the gas in said first plurality of passages, into another plurality of passages, arranged in parallel to each other, therein passing said gas first through substantially free space while being in heat exchange relation to the catalytic material in said first plurality of passages and then passing the gas in the last part of said second plurality of passages through catalytic material promoting the reaction and being in heat exchange relation to the gas in the substantially free space of said first plurality of passages.

2. The process of carrying out exothermic catalytic gas reactions which comprises passing the gas to be reacted upon in a plurality of passages, arranged in parallel to each other, first through substantially free space in said passages and then through catalytic material promoting the desired reaction arranged in the last part of said passages, collecting the gas leaving said plurality of passages in a space common to all of said passages, removing heat from said gas, then introducing said gas, in a direction of flow opposite to that of the gas in said first plurality of passages into another plurality of passages, arranged in parallel to each other, therein passing said gas first through substantially free space while being in heat exchange relation to the catalytic material in said first plurality of passages, and then passing the gas in the last part of said second plurality of passages through catalytic material promoting the reaction and being in heat exchange relation to the gas in the substantially free space of said first plurality of passages.

3. The process of carrying out exothermic catalytic gas reactions which comprises passing the gas to be reacted upon in a plurality of passages, arranged in parallel to each other, first through substantially free space in said passages and then through catalytic material promoting the desired reaction arranged in the last part of said passages, collecting the gas leaving said plurality of passages in a space common to all of said passages, admixing cold fresh gas to the gas in said chamber, then introducing said gas, in a direction of flow opposite to that of the gas in said first plurality of passages, into another plurality of passages, arranged in parallel to each other, therein passing said gas first through substantially free space while being in heat exchange relation to the catalytic material in said first plurality of passages, and then passing the gas in the last part of said second plurality of passages through catalytic material promoting the reaction and being in heat exchange relation to the gas in the substantially free space of said first plurality of passages.

4. Apparatus for carrying out exothermic catalytic gas reactions which comprises a vertical vessel, a false bottom in said vessel, a plurality of tubes inserted in said false bottom and extending almost to the top of said vessel, said tubes being in communication with the space below said false bottom and forming a plurality of passages, arranged in parallel to each other, while the space in said vessel surrounding said tubes forms another plurality of passages, arranged in parallel to each other, catalytic material promoting the desired reaction in the lower part of one of said pluralities of passages and in the upper part of the other of said pluralities of passages, means for withdrawing heat at the top of said vessel, and conduits for supplying gas to the lower part of one of said pluralities of passages and for withdrawing gas from the other of said pluralities of passages.

5. Apparatus for carrying out exothermic catalytic gas reactions which comprises a vertical vessel, a false bottom in said vessel, a plurality of tubes inserted in said false bottom and extending almost to the top of said vessel, said tubes being in communication with the space below said false bottom and forming a plurality of passages, arranged in parallel to each other, while the space in said vessel surrounding said tubes forms another plurality of passages, arranged in parallel to each other, catalytic material promoting the desired reaction in the lower part of one of said pluralities of passages and in the upper part of the other of said pluralities of passages, said catalytic material being arranged in several layers spaced apart from each other in at least one of said pluralities of passages, means for withdrawing heat at the top of said vessel, conduits for supplying gas to the lower part of one of said pluralities of passages and for withdrawing gas from the other of said pluralities of passages, and means in the lower part of said vessel for bringing gas to be withdrawn into heat exchange relation with the fresh gas to be supplied to one of said pluralities of passages.

JOSEPH BAYER.
ALFRED HALTMEIER.
KARL HENCKY.